United States Patent [19]
Smith

[11] Patent Number: 6,096,425
[45] Date of Patent: Aug. 1, 2000

[54] POLARIZED PLASTIC LAMINATES

[75] Inventor: Michael Barry Smith, Thousand Oaks, Calif.

[73] Assignee: Alcat, Incorporated, Milford, Conn.

[21] Appl. No.: 08/637,360

[22] Filed: Apr. 25, 1996

[51] Int. Cl.[7] .............................. B32B 27/36; B05D 5/06; G09J 201/00
[52] U.S. Cl. .................. 428/412; 428/423.1; 428/424.4; 428/425.1; 428/507; 428/522; 427/163.1; 427/164; 427/169; 427/208.8; 427/337; 156/329; 156/635
[58] Field of Search ................................ 428/412, 423.1, 428/424.4, 425.1, 507, 522; 427/163.1, 164, 169, 208.8, 337; 156/329, 635

[56] References Cited

U.S. PATENT DOCUMENTS

| | | | |
|---|---|---|---|
| 2,370,565 | 2/1945 | Muskat et al. | 526/71 |
| 3,067,078 | 12/1962 | Gluck | 428/164 |
| 3,885,072 | 5/1975 | Zibritosky | 428/38 |
| 4,073,986 | 2/1978 | Keslar et al. | 428/38 |
| 4,081,581 | 3/1978 | Littell | 428/138 |
| 4,127,682 | 11/1978 | Laurin | 427/164 |
| 4,139,674 | 2/1979 | Muller et al. | 428/339 |
| 4,364,786 | 12/1982 | Smith, Jr. et al. | 156/99 |
| 4,417,790 | 11/1983 | Dawson et al. | 351/166 |
| 4,504,341 | 3/1985 | Radzwill et al. | 156/102 |
| 4,611,892 | 9/1986 | Kawashima et al. | 351/159 |
| 4,645,146 | 2/1987 | Hall | 244/129.3 |
| 4,810,583 | 3/1989 | Brown et al. | 428/425.6 |
| 4,817,347 | 4/1989 | Hand et al. | 52/171.3 |
| 5,051,309 | 9/1991 | Kawaki et al. | 428/332 |
| 5,104,692 | 4/1992 | Belmares | 427/164 |
| 5,173,368 | 12/1992 | Belmares | 428/426 |
| 5,443,877 | 8/1995 | Kramer et al. | 428/43 |
| 5,443,912 | 8/1995 | Olson | 428/425.6 |
| 5,468,346 | 11/1995 | Bruce et al. | 216/34 |
| 5,757,459 | 5/1998 | Bhalakia et al. | 351/168 |

FOREIGN PATENT DOCUMENTS

| | | |
|---|---|---|
| 302537 B1 | 9/1991 | European Pat. Off. . |
| 654344 | 5/1995 | European Pat. Off. . |

OTHER PUBLICATIONS

Gruhn et al., "Etching Mechanism and Behaviour of Polycarbonates in Hydroxide Solution: Lexan and CR–39," Solid State Nuclear Track Detectors, edited by François et al., Proceedings of the 10th International Conference, Pergamon Press, New York, 1980.

*Primary Examiner*—Leszek Kiliman
*Attorney, Agent, or Firm*—Maurice M. Klee

[57] ABSTRACT

A transparent polarized plastic laminate is provided which includes:

(a) a first plastic layer;

(b) a second layer comprising a polyurethane polymer;

(c) a third layer comprising a sandwich of a stretched and dyed polyvinyl alcohol film between two layers of cellulose triacetate or acrylic;

(d) a fourth layer comprising a polyurethane polymer; and (e) a fifth plastic layer.

29 Claims, 1 Drawing Sheet

POLARIZED PLASTIC LAMINATES

FIELD OF THE INVENTION

This invention relates to polarized plastic laminates.

BACKGROUND OF THE INVENTION

Polarized plastic laminates are used for a variety of purposes including filters, optical elements, instrument display readout windows, sunglasses, and sport optical products, such as, ski goggles, motor cycle goggles, water sports goggles, and the like.

In the past, such laminates have comprised a cellulose acetate butyrate (CAB) outer sheet laminated to a polarizer comprising a thin film of stretched polyvinyl alcohol (PVA) dyed with an aqueous solution of iodine and potassium iodide or an organic dichroic dye, laminated to a CAB inner sheet, i.e., the laminates have comprised a polarizer sandwiched between two CAB sheets. The dyeing of the PVA sheet with iodine and potassium iodide or with an organic dichroic dye gives the sheet a neutral gray color. The thermoplastic CAB serves as a support for the thin fragile PVA polarizing element and thus allows it to be thermoformed into various curved shapes. Some polarized plastic laminates have used acrylic in place of one or both of the cellulose acetate butyrate sheets.

Although generally successfully, these products have suffered from some deficiencies. In particular, the products have lacked impact resistance which is clearly an important property for a product which is to be used in vigorous sports activities.

Also, the production of colored laminates has posed some problems. Polarized plastic laminates used in such applications as sunglass lenses, shields and ski goggles, need to be available in various colors in order to satisfy the requirement of different environmental viewing conditions and fashion demands.

In the past, colored polarized laminates have been produced by obtaining colored CAB support sheets and laminating those sheets to the gray PVA polarizing element thus resulting in a colored laminate. This method of producing colored polarized laminates has several major disadvantages. First, CAB is expensive and requires long lead times and large quantity purchases. Further, CAB is not available in all colors and custom color formulations are difficult to make, expensive, and again require long lead times. Long lead times are an especially significant problem in the field of fashion eyewear, where the successful producer of laminates must respond quickly to market and fashion changes which may only last for a single season. Colored polarized plastic laminates using CAB have had a difficult time meeting the color and timing requirements of this important market.

The present invention is designed to overcome both the impact and coloring deficiencies of prior art polarized plastic laminates.

SUMMARY OF THE INVENTION

In view of the foregoing, it is an object of the invention to provide improved polarized plastic laminates. In particular, it is an object of the invention to provide polarized plastic laminates which simultaneously satisfy at least some and preferably all of the following criteria: (1) impact resistance; (2) scratch resistance; (3) craze resistance; (4) resistance to chemical or environmental deterioration; (5) flex accommodation; (6) easy dyeability in a variety of colors; (7) good optical properties; (8) the ability to be easily manufactured in a variety of shapes; and (9) low cost.

To achieve the foregoing and other objects, the invention in accordance with certain of its aspects provides a transparent polarized plastic laminate comprising in order:

(a) a first plastic layer;

(b) a second layer comprising a polyurethane polymer;

(c) a third layer comprising a sandwich of either a stretched and dyed polyvinyl alcohol film between two layers of cellulose triacetate or a stretched and dyed polyvinyl alcohol film between two layers of acrylic;

(d) a fourth layer comprising a polyurethane polymer; and (e) a fifth plastic layer.

In accordance with other aspects of the invention, a method of forming a transparent polarized plastic laminate is provided which comprises:

(a) providing a first plastic layer;

(b) providing a second layer comprising a polyurethane polymer;

(c) providing a third layer comprising a sandwich of either a stretched and dyed polyvinyl alcohol film between two layers of cellulose triacetate or a stretched and dyed polyvinyl alcohol film between two layers of acrylic;

(d) providing a fourth layer comprising a polyurethane polymer;

(e) providing a fifth plastic layer;

(f) etching both outer surfaces of the third layer with an alcoholic alkali solution;

(g) coating the etched outer surfaces of the third layer with a polysiloxane coupling agent; and (h) laminating the first through fifth layers together in that order.

Preferably, the first and fifth plastic layers are selected from the group consisting of polycarbonate plastics, allyl diglycol carbonate (ADC) plastics, and acrylic plastics, with polycarbonate plastics being most preferred.

For some applications, it is desirable to include an UV absorber in the laminate. Such an absorber can be incorporated in the second or fourth layers, or alternatively, in both of those layers. The upper wavelength cutoff for the absorber can be approximately 380 nanometers and is preferably approximately 400 nanometers. The absorber should achieve 99% absorbtion at 380 nanometers. The second and fourth layers also can include a dye to provide a desired color to the laminate. Again, the dye can be in either both the second and fourth layers or in only one of these layers.

Figure 1:
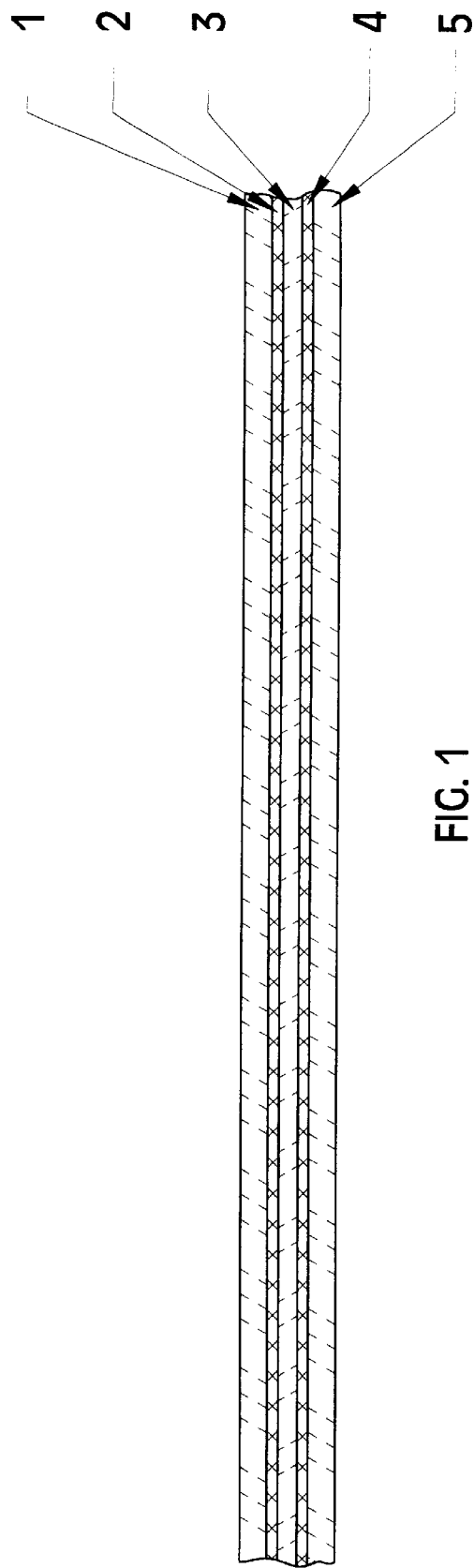
FIG. 1 is a cross-sectional view of a polarized plastic laminate constructed in accordance with the present invention.

The foregoing drawing, which is incorporated in and constitutes part of the specification, illustrates a preferred embodiment of the invention, and together with the description, serves to explain the principles of the invention. It is to be understood, of course, that both the drawing and the description are explanatory only and are not restrictive of the invention.

DESCRIPTION OF THE PREFERRED EMBODIMENTS

As discussed above, the present invention relates to five layer laminates wherein the first and fifth layers are selected from the group consisting of polycarbonate plastics (e.g., polycarbonates from General Electric), allyl diglycol carbonate (ADC) plastics (e.g., ADC polymers from Optical Polymers International (Milford, Conn.) and acrylic plastics (e.g., acrylics from Rohm & Haas or American Acrylics), the second and fourth layers are polyurethane (adhesive) layers, and the third layer provides polarizing properties to the laminate by being a sandwich of a stretched and dyed polyvinyl alcohol film between two layers of cellulose triacetate or two layers of acrylic (e.g., polarizing laminates from Polaroid or Nitto Denko of Japan). As discussed above, the dyeing of the polyvinyl alcohol film is performed with iodine and potassium iodide or an organic dichroic dye so as to provide the film with the requisite polarization properties.

The first and fifth layers can be the same or different. They provide structural strength to the laminate. If desired, one or both of these layers can be hardcoated in accordance with techniques well known in the art. The first and fifth layers need to be optically clear and should exhibit low haze. Preferably, these layers each have a thickness of around 0.25 millimeters (0.010 inches).

The second and fourth layers comprise a polyurethane polymer. Preferably, an aliphatic, thermoplastic, polyurethane film is used for these layers. Alternatively, these layers can be formed by dipping the third layer into a polyurethane coating solution and then curing or drying the polyurethane coating in place on the faces of the third layer. The second and fourth layers need to be optically clear and should exhibit low haze. Preferably, these layers each have a thickness of around 0.1 millimeters (0.004 inches) and a softening point of about 180° F. Suitable polyurethane films for use in the present invention are available from Deerfield Polyurethane Company, Deerfield, Mass., under the product designation X1275T. The second and fourth layers perform the function of providing the overall laminate with a high level of impact resistance. They do so by absorbing and dissipating the energy of a direct blow to the first or fifth layer.

The third layer provides polarizing properties to the overall laminate. In particular, the stretched and dyed PVA only passes polarized light of one orientation. In this way, the intensity of light which passes through the laminate is substantially reduced. Also, glare from water, oil films, snow, and the like is minimized. As with the other layers, the third layer also needs to be optically clear and should exhibit low haze. Preferably, the third layer has a thickness of at least about 0.18 millimeters (0.007 inches).

Because the outer surfaces of the third layer are composed of cellulose triacetate or acrylic, these surfaces do not bond well to polyurethanes. In accordance with the invention, adhesion is achieved by chemical etching of the outer surfaces of the third layer followed by coating of those surfaces with a silane coupling agent. The chemical etching is performed using an alcoholic alkali solution. Various such solutions known in the art can be used, a preferred solution being a sodium methoxide solution. The alkali concentration in the solution is preferably in the range of from about 2 percent by weight to about 20 percent by weight.

The etching of the outer surfaces of the third layer is preferably performed at room temperature by submerging that layer into the etching solution. The etching is conducted for a period of time sufficient to achieve strong bonding, but not so long as to cause frosting, pitting, orange-peeling, or other optical deterioration of the surfaces of the third layer.

Bonding between the surfaces of the third layer and the second and fourth layers is achieved through the use of a silane coupling agent. Various silane coupling agents known in the art can be used, preferred agents being amino-organosilane coupling agents, such as those sold by United Chemical Technologies Incorporated (Bristol, Pa.). Smith, Jr. et al., U.S. Pat. No. 4,364,786, discusses the use of organo silane coupling agents to bond a polyurethane layer to a glass layer, but does not disclose the use of such coupling agents with cellulose triacetate or acrylic.

The silane coupling agent is coated onto the etched surfaces of the third layer and dried onto those surfaces prior to the bonding with the second and fourth layers. The heating of these three layers, i.e., the second, third, and fourth layers, causes the bonding agent to form a tight couple between these otherwise nonadherent materials.

As with cellulose triacetate and acrylic, ADC polymers do not bond well to polyurethanes. Accordingly, the etching and silane bonding procedures described above for the third layer are applied to the first and/or fifth layers when those layers are composed of sheets of ADC polymer. The same procedures are used, the only significant difference being that the etching is performed for a longer period of time with the ADC polymer, e.g., 2 minutes, as compared to the time used with cellulose triacetate (e.g., 12 seconds). Laurin, U.S. Pat. No. 4,127,682; Dawson et al., U.S. Pat. No. 4,417,790; Kawashima et al., U.S. Pat. No. 4,611,892; Belmares, U.S. Pat. No. 5,104,692; Belmares, U.S. Pat. No. 5,173,368; and Gruhn et al., "Etching Mechanism and Behaviour of Polycarbonates in Hydroxide Solution: Lexan and CR-39, " *Solid State Nuclear Track Detectors,* edited by François et al., Proceedings of the 10th International Conference, Pergamon Press, New York, 1980, discuss the etching of ADC polymers, specifically, CR-39 polymers, with alcoholic alkali solutions.

Lamination of the five layer sandwich is preferably performed in an autoclave by placing the sandwich in a vacuum bag, evacuating the bag, and then applying heat and pressure. Preferably, the sandwich is mounted between plates of glass to produce a flat finished product having superior optical properties. The amount of heat and pressure used and the overall cycle time for bonding will depend on the specific materials used for the five layers, as well as the silane bonding agent and the amount of etching performed on the surfaces of the third layer (and the first and/or fifth layers when those layers are composed of an ADC polymer). In general terms, the heat and pressure need to be high enough to soften the polyurethane interlayer so that it can undergo bonding, without being so high as to substantially softening either the first, third, or fifth layers. Suitable temperatures, pressures, and cycle times include: temperatures in the range of about 180° F. to about 210° F., pressures in the range from about 75 psi to about 200 psi, and cycle times in the range of from about 30 minutes to about 150 minutes.

As discussed above, in some cases, it may be desirable to include an UV absorber in the polarized plastic laminate. The amount of UV absorber used will depend on the level of UV blockage desired. Various UV absorbers known in the art can be used, such as benzophenones, e.g., UVINUL No. 3050, manufactured by BASF Corporation, Rensselaer, N.Y., whose upper wavelength cutoff is approximately 400 nanometers. Mixtures of UV absorbers can be used if desired. The UV absorber is preferably incorporated in one or both of the polyurethane layers. The UV absorber can be incorporated in a polyurethane film by, for example, dipping the film in an alcoholic solution of the absorber, e.g., a solution containing from about 0.5 wt. % to about 2 wt. %, e.g., about 1 wt. %, of the absorber in methanol, for a period of time sufficient for the film to take up the absorber. Alternatively, if the polyurethane layers are formed by coating the third layer with a polyurethane solution, the UV absorber can be incorporated in that solution before the coating is performed.

As also discussed above, in some cases, it may be desirable to include a dye in the polarized plastic laminate. The amount and color of the dye will depend on the desired final color and light absorbancy of the polarized plastic laminate. Various organic dyes known in the art can be used, such as those produced by Organic Dyestuffs Corporation, East Providence, R.I. Mixtures of dyes can also be used if desired. The dye is preferably incorporated in one or both of the polyurethane layers. The dye can be incorporated in a polyurethane film by, for example, dipping the film in an alcoholic solution of the dye. The alcoholic solution can, for example, comprise: 0.2 wt. % to 4 wt. %, e.g., 1.0 wt. %, of the dye; 0.01 wt. % to 2 wt. %, e.g., 0.5 wt. % of a surfactant; with the remainder being a water/methanol solution, e.g., 25 wt. % methyl alcohol and 75 wt. % distilled water. The polyurethane film is dipped into the dyeing solution for a period of time sufficient for the film to take up the dye, e.g., from about 1 minute to about 10 minutes. Alternatively, if the polyurethane layers are formed by coating the third layer with a polyurethane solution, the dye can be incorporated in that solution before the coating is performed. Further, if both a dye and a UV absorber are to be included in the laminate, they can be incorporated in one or both of the polyurethane layers either at the same time or separately, simultaneous incorporation being preferred.

Without intending to limit it in any manner, the present invention will be more fully described by the following examples.

EXAMPLE 1

Preparation of a Polarized Plastic Laminate

This example illustrates the construction of a polarized plastic laminate in accordance with the present invention. FIG. 1 is a cross-sectional view of the finished laminate. In this figure, the reference numbers 1–5 refer to the first through fifth layers, respectively. The laminate was prepared using the following materials:

(1) two pieces of LEXAN brand polycarbonate sheet, each piece being 19"×19"×0.25 mm thick;

(2) two pieces of X1275T polyurethane film, each piece being 19"×19"×0.1 mm thick; and (3) one piece of cellulose triacetate polarizer film, said piece being 19"×19"×0.2 mm thick.

The cellulose triacetate polarizer film was placed into a wire rack and dipped into an etching solution prepared by diluting a 30 wt. % sodium methoxide solution in methanol, purchased from Acros Organics, to a 4.5 wt. % solution with anhydrous methanol. The solution was used at room temperature after thorough mixing. The cellulose triacetate polarizer film was dipped into the solution for 12 seconds. Upon removal from the etching solution, the film was rinsed with 120° F. tap water, and then with room temperature distilled water. Excess water drops were removed using a static free air knife. After all excess water was removed, the film was dried in an air circulating oven at 120° F. for 30 minutes, following which the film was removed from the oven and cooled to room temperature.

Coating of the etched film with a silane coupling agent was accomplished by fixturing the film in a rack and dipping it into the silane coating solution. The coating solution was prepared as follows: the commercially available silane coupling agent, N-(2-aminoethyl)-3-aminopropyltrimethoxysilane, catalog number A0700, was purchased from United Chemical Technologies, Inc. A 95% ethanol, 5% water solution was prepared and used to dilute the stock silane solution to 2% by volume.

The etched film was dipped into the coating solution at room temperature for 2 minutes, removed and allowed to drain. The coated film was then quickly rinsed in ethanol. After rinsing, the coated film was placed into an oven and dried at 120° F. for 1 hour.

Lamination of the five layers was accomplished in an autoclave using heat and pressure within a vacuum bag. The layers were assembled into a sandwich and placed between sheets of flat glass (curved glass can also be used if desired). This assembly was carefully placed into a nylon autoclave vacuum bag. The bag was sealed using a sealant tape, evacuated, placed into an autoclave, and attached to a vacuum line. The autoclave cycle consisted of heating the assembly from ambient temperature to 220° F. in 45 minutes while the pressure was increased from atmospheric to 90 PSI. The assembly was held at 220° F. and 90 PSI for one hour and then cooled to ambient temperature in 45 minutes. The pressure was reduced to ambient after cooling to room temperature. The bagged assembly was carefully disassembled and the finished product removed.

The resulting polarized plastic laminate was found to have been successfully produced in all respects. In particular, the laminate was found to be flat and to have excellent optical properties.

EXAMPLE 2

Preparation of a Dyed Polarized Plastic Laminate

A dyed polarized plastic laminate was prepared following the procedures of Example 1 with the additional steps of dyeing the polyurethane layers as follows.

The X1275T polyurethane film (0.1 mm thick) was attached with clips to a wire rack on all sides. Attachment to all sides of the film is considered important so as to prevent the polyurethane film from sagging, folding upon itself, or sticking together. Wrinkles or folds in the film can cause uneven dyeing and result in streaking in the finished laminate.

A dyeing solution was prepared by dissolving 1% by weight of Orcocilacron Orange LF organic dyestuff purchased from Organic Dyestuffs Corporation, East Providence, R.I., and 0.5% by weight surfactant Orcoterge 35-C also purchased from Organic Dyestuffs Corporation, in a solution of 25% by weight methyl alcohol and 75% by weight distilled water. The solution was thoroughly mixed to completely dissolve the dye powder. The dye solution was poured into a tank and heated to 100° F. (other temperatures from 70° to 150° F. can be used) and maintained at this temperature with constant circulation during the dyeing process.

The polyurethane film and rack were slowly lowered into the dye solution. After 2 minutes (times can range from 1–10 minutes), the rack and film were removed and immediately rinsed by submerging into a tank of room temperature distilled water. The rack was gently raised and lowered in the tank to completely remove all excess dye solution. The film was then rinsed by dipping into a second tank of room temperature distilled water. After the second rinse, the excess water was removed from each side of the film with air from an air knife.

The dyed polyurethane film was then placed in a circulating oven at 120° F. for 30 minutes. After drying, the film was removed from the rack and ready for incorporation in a polarized laminate in accordance with the procedures of Example 1. The polarized laminate may incorporate one or two dyed polyurethane layers depending on the optical transmission required and the particular color.

Although specific embodiments of the invention have been described and illustrated, it is to be understood that modifications can be made without departing from the invention's spirit and scope. For example, although the invention has been described in terms of a five layer laminate, additional layers can be included in the overall structure if desired.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. A transparent polarized plastic laminate comprising in order:
   (a) a first plastic layer;
   (b) a second layer comprising a polyurethane polymer;
   (c) a third layer comprising a sandwich of either a stretched and dyed polyvinyl alcohol film between two layers of cellulose triacetate or a stretched and dyed polyvinyl alcohol film between two layers of acrylic;
   (d) a fourth layer comprising a polyurethane polymer; and
   (e) a fifth plastic layer;
   wherein either or both of the first and fourth layers comprises a UV absorber.

2. A method for forming a transparent polarized plastic laminate comprising:
   (a) providing a first plastic layer;
   (b) providing a second layer comprising a polyurethane polymer;
   (c) providing a third layer comprising a sandwich of either a stretched and dyed polyvinyl alcohol film between two layers of cellulose triacetate or a stretched and dyed polyvinyl alcohol film between two layers of acrylic;
   (d) providing a fourth layer comprising a polyurethane polymer;
   (e) providing a fifth plastic layer;
   (f) etching both outer surfaces of the third layer with an alcoholic alkali solution;
   (g) coating the etched outer surfaces of the third layer with a polysiloxane coupling agent; and
   (h) laminating the first through fifth layers together in that order.

3. The method of claim 2 wherein the second and fourth layers are formed by coating the product of step (g) with a polyurethane polymer.

4. The method of claim 2 wherein the first plastic layer is selected from the group consisting of polycarbonate plastics, allyl diglycol carbonate (ADC) plastics, and acrylic plastics.

5. The method of claim 4 wherein the first plastic layer is a polycarbonate plastic.

6. The method of claim 2 wherein the fifth plastic layer is selected from the group consisting of polycarbonate plastics, allyl diglycol carbonate (ADC) plastics, and acrylic plastics.

7. The method of claim 6 wherein the fifth plastic layer is a polycarbonate plastic.

8. The method of claim 2 wherein either or both of the second and fourth layers contains an UV absorber.

9. The method of claim 8 wherein the upper wavelength cutoff of the UV absorber is approximately 400 nanometers.

10. The method of claim 8 wherein the UV absorber is introduced into the layer or layers by dipping the layer or layers into a solution containing the UV absorber.

11. The method of claim 2 wherein either or both of the second and fourth layers contains a dye.

12. The method of claim 11 wherein the dye is introduced into the layer or layers by dipping the layer or layers into a solution containing the dye.

13. A transparent polarized plastic laminate comprising in order:
   (a) a first plastic layer;
   (b) a second layer comprising a polyurethane polymer;
   (c) a third layer which provides polarizing properties to the laminate;
   (d) a fourth layer comprising a polyurethane polymer; and
   (e) a fifth plastic layer;
   wherein either or both of the first and fourth layers comprises a UV absorber.

14. A transparent polarized plastic laminate comprising in order:
   (a) a first plastic layer;
   (b) a second layer comprising a polyurethane polymer;
   (c) a third layer comprising a sandwich of either a stretched and dyed polyvinyl alcohol film between two layers of cellulose triacetate or a stretched and dyed polyvinyl alcohol film between two layers of acrylic;
   (d) a fourth layer comprising a polyurethane polymer; and
   (e) a fifth plastic layer;
   wherein either or both of the first and fourth layers comprises a dye.

15. A transparent polarized plastic laminate comprising in order:
   (a) a first plastic layer;
   (b) a second layer comprising a polyurethane polymer;
   (c) a third layer which provides polarizing properties to the laminate;
   (d) a fourth layer comprising a polyurethane polymer; and
   (e) a fifth plastic layer;
   wherein either or both of the first and fourth layers comprises a dye.

16. A transparent polarized plastic laminate comprising in order:
   (a) a first plastic layer;
   (b) a second layer comprising a polyurethane polymer;
   (c) a third layer comprising a sandwich of either a stretched and dyed polyvinyl alcohol film between two layers of cellulose triacetate or a stretched and dyed polyvinyl alcohol film between two layers of acrylic;
   (d) a fourth layer comprising a polyurethane polymer; and
   (e) a fifth plastic layer;
   wherein the third layer has an outer surface at least a portion of which has been etched with an alcoholic alkali solution and coated with a polysiloxane coupling agent.

17. A transparent polarized plastic laminate comprising in order:
   (a) a first plastic layer;
   (b) a second layer comprising a polyurethane polymer;
   (c) a third layer which provides polarizing properties to the laminate;

(d) a fourth layer comprising a polyurethane polymer; and (e) a fifth plastic layer;

wherein the third layer has an outer surface at least a portion of which has been etched with an alcoholic alkali solution and coated with a polysiloxane coupling agent.

18. The transparent polarized plastic laminate of claim 1 or 13 wherein the upper wavelength cutoff of the UV absorber is approximately 400 nanometers.

19. A method for forming a transparent plastic laminate comprising:
   (a) providing a plastic layer comprising a material selected from the group consisting of cellulose triacetate, acrylic plastics, and allyl diglycol carbonate plastics;
   (b) treating a surface of said plastic layer by:
      (1) etching the surface with an alcoholic alkali solution; and
      (2) coating the etched surface with a polysiloxane coupling agent;
   (c) providing a layer of a polyurethane polymer; and
   (d) laminating the polyurethane layer to said treated surface.

20. A transparent plastic laminate comprising:
   (a) a layer of a polyurethane polymer; and
   (b) a layer of a material selected from the group consisting of cellulose triacetate, acrylic plastics, and allyl diglycol carbonate plastics, said layer having a surface which:
      (1) contacts the polyurethane layer;
      (2) has been etched with an alcoholic alkali solution; and
      (3) after etching, has been coated with a polysiloxane coupling agent.

21. The transparent polarized plastic laminate of claim 1, 13, 14, 15, 16, or 17 wherein the first plastic layer is selected from the group consisting of polycarbonate plastics, allyl diglycol carbonate (ADC) plastics, and acrylic plastics.

22. The transparent polarized plastic laminate of claim 21 wherein the first plastic layer is a polycarbonate plastic.

23. The transparent polarized plastic laminate of claim 1, 13, 14, 15, 16, or 17 wherein the fifth plastic layer is selected from the group consisting of polycarbonate plastics, allyl diglycol carbonate (ADC) plastics, and acrylic plastics.

24. The transparent polarized plastic laminate of claim 23 wherein the fifth plastic layer is a polycarbonate plastic.

25. The transparent polarized plastic laminate of claim 14, 15, 16, or 17 further comprising a UV absorber.

26. The transparent polarized plastic laminate of claim 25 wherein the upper wavelength cutoff of the UV absorber is approximately 400 nanometers.

27. The transparent polarized plastic laminate of claim 25 wherein either or both of the second and fourth layers contain the UV absorber.

28. The transparent polarized plastic laminate of claim 1, 13, 16 or 17 further comprising a dye.

29. The transparent polarized plastic laminate of claim 28 wherein either or both of the second and fourth layers contain the dye.

* * * * *